May 28, 1957  P. SALMON-LEGAGNEUR  2,793,517
CONTROL DEVICE FOR GAS-LIGHTED FLASHING BEACONS
Filed Sept. 17, 1954  4 Sheets-Sheet 1

INVENTOR
PIERRE SALMON-
LEGAGNEUR

May 28, 1957   P. SALMON-LEGAGNEUR   2,793,517
CONTROL DEVICE FOR GAS-LIGHTED FLASHING BEACONS
Filed Sept. 17, 1954   4 Sheets-Sheet 2

INVENTOR
PIERRE SALMON-LEGAGNEUR
BY Wenderoth, Lind & Ponack
Attys.

May 28, 1957 P. SALMON-LEGAGNEUR 2,793,517
CONTROL DEVICE FOR GAS-LIGHTED FLASHING BEACONS
Filed Sept. 17, 1954 4 Sheets-Sheet 3

INVENTOR
PIERRE SALMON-LEGAGNEUR
BY
Wenderoth, Lind & Ponack
Attys

May 28, 1957 P. SALMON-LEGAGNEUR 2,793,517
CONTROL DEVICE FOR GAS-LIGHTED FLASHING BEACONS
Filed Sept. 17, 1954 4 Sheets-Sheet 4

INVENTOR
PIERRE SALMON-LEGAGNEUR
BY Wenderoth, Lind & Ponack
Attys

United States Patent Office 2,793,517
Patented May 28, 1957

2,793,517

CONTROL DEVICE FOR GAS-LIGHTED FLASHING BEACONS

Pierre Salmon-Legagneur, Paris, France, assignor to Etablissements Henry-Le Paute, Paris, France, a society of France Application September 17, 1954, Serial No. 456,739

Claims priority, application France September 25, 1953

5 Claims. (Cl. 67—111)

This invention relates to ground-lighting and more particularly to beacons of the type comprising gas lights and means adapted to provide the inherent and specific character of each beacon, i. e. the characteristics of the visual signals emitted from the lights.

As a rule, the gas lights equipping these ground-lighting systems are controlled by gas-actuated flash-gears wherein the different characters are provided by a mechanism controlled in turn by the very output of the burner-feeding gas. According to this prior technique, a combination of cams and needle-valves makes it possible to adjust the gas input in the various parts of the device and therefore to determine the character of the beacon and its actual rate of recurrence or flashing.

The chief drawback of this system lies in its lack of stability and in its delicate adjustment. In fact, the rate of flashing may vary within wide limits, particularly on account of the impurities contained in the gas and likely to choke the needle-valves, of the condensation-producing gas humidity, of the gas temperature and viscosity, of the constancy variations of the resiliency of the diaphragm and springs with time and at various temperatures, etc. When extreme conditions occur it is even possible to observe not only variations in the flashing rate but also in the signal character, which is a very serious inconvenience in navigation.

It is the chief object of this invention to avoid these drawbacks by providing means adapted to produce the inherent character of a specific flashing beacon, these means comprising a spring-actuated mechanism of any type adapted rotatably to drive one or a plurality of cams actuating in turn, at a predetermined and constant rate, the inlet valve controlling the supply of gas to the burner with the assistance of a speed adjusting device (centrifugal governor, clockwork escapement, etc.) in combination with a device adapted automatically to cause the burner-feeding gas to wind the spring of the aforesaid mechanism. Thus, with the device according to this invention the gas is utilized only as a prime mover for winding the power spring, and the adjustment of the rate of flashing, while being completely independent of the gas characteristics, is subordinate only to the proper operation of the mechanism and to the quality of its speed adjusting means (centrifugal governor, clockwork escapement, etc.).

In order to minimize losses due to frictional contacts, it is another feature of this invention to cause the aforesaid mechanism to operate completely within the gaseous medium at the burner pressure. Thus, any movable or frictional packings, such as sliding-contact packings, which are likely to absorb a substantial amount of energy, can be dispensed with completely.

Other characteristic features and advantages of the invention will appear as the following description of a form of embodiment thereof given by way of example only, proceeds with reference to the attached drawings forming part of this specification. In the drawings.

Figure 1:
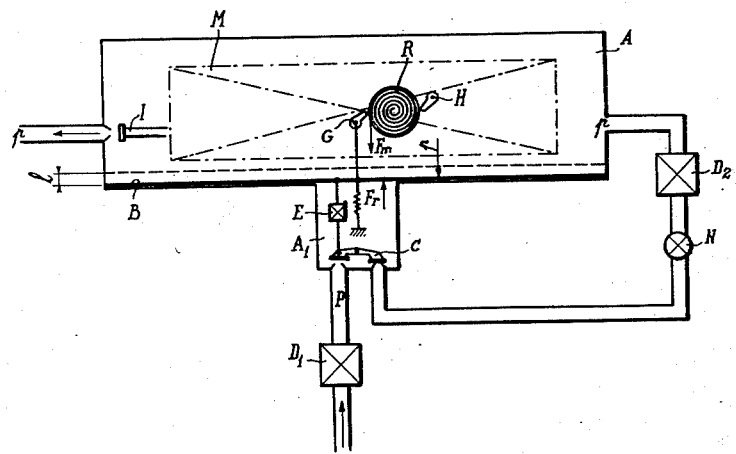
Figs. 1 and 2 are diagrammatical views showing a device according to this invention at two different stages of its operation.
Figure 2:
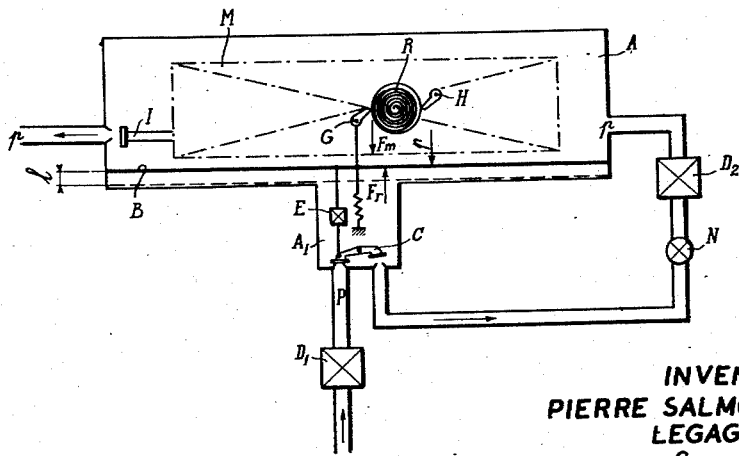

Referring first to Figs. 1 and 2 of the drawings, A is a casing in which a piston B having a cross-sectional area S is slidably mounted. This piston may advantageously be replaced by a diaphragm in order to avoid notably gas leaks. In Fig. 1 this piston is shown in thick lines in its lowermost position and in dotted lines in its uppermost position, the piston "stroke" being represented by the reference letter $l$.

C is a twin-valved rocker controlling the gas inlet from a pressure-reducing device $D_1$ and the delivery of gas to another pressure-reducing device $D_2$ adjusted to deliver gas to the upper compartment of casing A at a pressure $p$ suitable for feeding the burner.

The twin-valved rocker C is operatively connected to the piston B through a device E of known construction so that when the piston reaches its lowermost position this device E will cause the twin-valved rocker C to be suddenly reversed to open the port leading from $D_1$ and close the port leading to $D_2$, and when the piston is driven to its uppermost position the device E will also actuate the twin-valved rocker C in the opposite direction (Fig. 2).

$F_r$ is a return spring urging constantly the piston to its lowermost position. R is the power spring of the mechanism; when the piston is moved upwards, this spring R is wound through a pawl G and a locking pawl H is adapted to prevent the spring R from being unwound by the downward movement of the piston. This pawl applies a force $F_m$ on the piston which is added to $F_r$.

The supply of gas to the burner is controlled through a valve I actuated from a clockwork M of known construction and therefore shown only in chain-dotted lines.

The above-described device operates as follows:

Assuming that at the start the various parts are positioned as shown in Fig. 1.

*1st stage.*—The gas compressed at a pressure P contacts the lower face of the piston; this pressure which exists in the lower portion of the casing A rises to a value $P' \leq P$ such that $$(P'-p)S = F_r + F_m$$

When $(P'-p)$ becomes higher than $F_r + F_m$, the piston is moved upwards and causes the power spring R to be wound to the extent of one step of its clockwork (preferably the spring will have a preliminary amount of winding), so that the mechanism M will be started and control the opening and closing of valve I for the inlet to the gas burner at the predetermined rate.

*2nd stage.*—As the piston approaches its uppermost position, the device E causes the position of the twin-valved rocker C to be suddenly reversed, thus closing the inlet from $D_1$ and opening the delivery to $D_2$ placed in communication with $A_1$ (see Fig. 2), in order to supply the upper portion of the casing A with gas at the burner-operating pressure $p$.

*3rd stage.*—As the gas escapes to $D_2$ the pressure $P'$ in the lower portion of casing A is reduced to a value $P''$ such that $(p-P'')S + F_r =$ force required for on the one hand delivering the gas to $D_2$ at a pressure value slightly in excess of $p$ and on the other hand overcoming frictional stresses.

When $(p-P'')S+Fr$ exceeds this value, the piston moves downwards.

*4th stage.*—When the piston reaches its lowermost position the twin-valved rocker C is again reversed and the various components of the device resume their initial positions, the various functions occurring again in the same sequence as long as the burner is open and as gas pressure is available to feed $D_1$.

From the foregoing it will be readily apparent that the power spring R will be wound by impulses produced as the burner operates. If it is desired to discontinue the operation of the device the cock N may be closed, for example. Thus, the supply of light gas to the burner will cease and as the pressure below the piston B is maintained the latter will be locked in position.

A known device (for example a friction clutch) associated with the spring R or a clutch device acting on the pawl G will be provided to prevent the piston B from being jammed in case the spring R were fully wound.

The dimensions and characteristics of the different component elements of the device (piston diameter and stroke, strength of the various springs, etc.) are subordinate to the beacon character implying a minimum average gas output to the burner and may be calculated after the pressure $p$ required for feeding this burner directly and after the pressure P corresponding to the minimum gas pressure in the supply tank when the latter is almost completely empty.

On the other hand it will be advantageous to keep the volume $A_1$ beneath the piston B to the minimum value, when this piston is in its lowermost position so that this chamber may reach the pressure P in the shortest possible time period when the inlet valve of C is opened. This purpose may be achieved by forming this twin-valved device C and its control device E with the smallest dimensions consisted with a proper operation of the assembly and by reducing the unused volume beneath the piston B to a very small value. Thus, the system will operate under a practically constant pressure and the force available for winding the power spring R will be:

$$(P-p)S-Fr$$

$Fr$ being the force just necessary to overcome the frictional stresses resulting from the return or downward movement of the piston, which is very low relative to $(P-p)S$ as the latter may easily attain about 400 to 500 p. s. i.

For all practical purposes, the force will be $(P-p)S$, and if $n$ is the number of piston strokes per time unit the power value supplied by the piston for winding the spring R will be $$W=(P-p)S.\ l.\ n.$$

$S.\ l.\ n.$ is the gas output at the pressure P, this output being known since the burner output at the pressure $p$ is already known.

Figure 3:
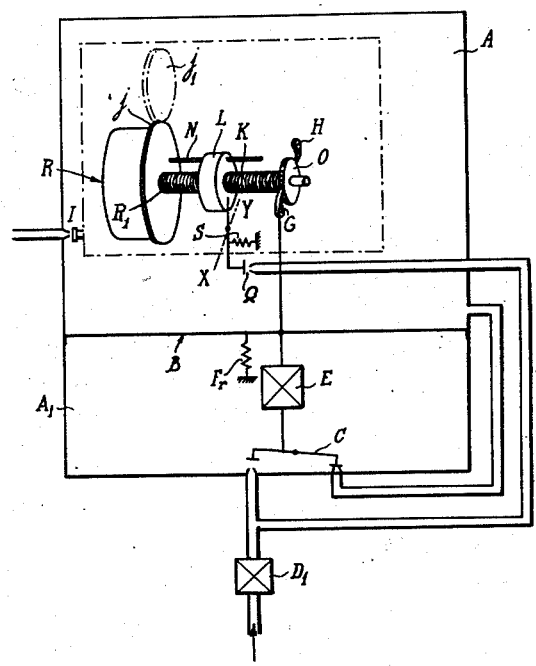
Figure 3 shows diagrammatically an arrangement for winding and for the control of the valve for the inlet of gas into the enclosure comprising the mechanical movement.

Fig. 3 illustrates a spring arrangement for the mechanical movement wherein a movable member whose displacements are subordinate to the degree of winding of the power spring controls the twin-valved rocker in such a manner that when the spring is wound a pressure balance obtains between the two faces of the piston or diaphragm so as to hold the latter against motion and that when the spring is released completely the pressure balance is discontinued, thereby permitting the piston or diaphragm to operate again and wind the spring.

The power spring R is enclosed in a barrel J. One end of the spiral spring R is anchored to the outer periphery of the barrel controlling through gears $j$ and $j_1$ the mechanism M actuating in turn the inlet valve I of the burner. The other end of the power spring R is secured to the barrel plug which is formed with an outer screw-threaded extension K carrying at its end a ratchet wheel O. The screw or plug passes through an opening $R_1$ of the barrel R. Its rotation, which assures the winding of the spring, is controlled by the ratchet wheel O''. A nut L engages this screw-threaded portion K and a rod N fast with the barrel extends through a hole formed in the nut L to enable the latter to move in a direction parallel to the axis of the screw K when the latter is rotated.

When the spring R is wounded by the action of the ratchet wheel O actuated in turn by the pawl G fast with the diaphragm B, the nut L which is nonrotatable with respect to plug K is moved to the right (Fig. 3) and causes a valve Q to be rocked about the axis X—Y to open the gas inlet from the pressure reducer $D_1$, thereby bringing the pressure within the casing A to the same value as in the lower chamber $A_1$ and, therefore, locking the diaphragm B in position while maintaining the supply of gas to the burner through the valve I.

As the spring R is unwound by actuating the mechanism M, the nut L which is controlled by the rod N is moved to the left and eventually closes the valve Q while causing it to pivot about the axis XY. Thus, the pressure in the upper chamber A decreases and the diaphragm B resumes its spring-winding action.

From the foregoing it is apparent that a sequence of operations is obtained whereby the diaphragm and the parts rigid therewith are actuated just to the extent required to keep the power spring R in its fully wound condition.

The great constructional simplicity of this device is complemented by the advantage that the members utilized for the winding operation are exposed to a minimum wear since they only work for the time period required for keeping the power spring R in its fully wound condition. Finally, this device makes it possible to provide a self-regulation of the burner gas pressure.

Figure 4:
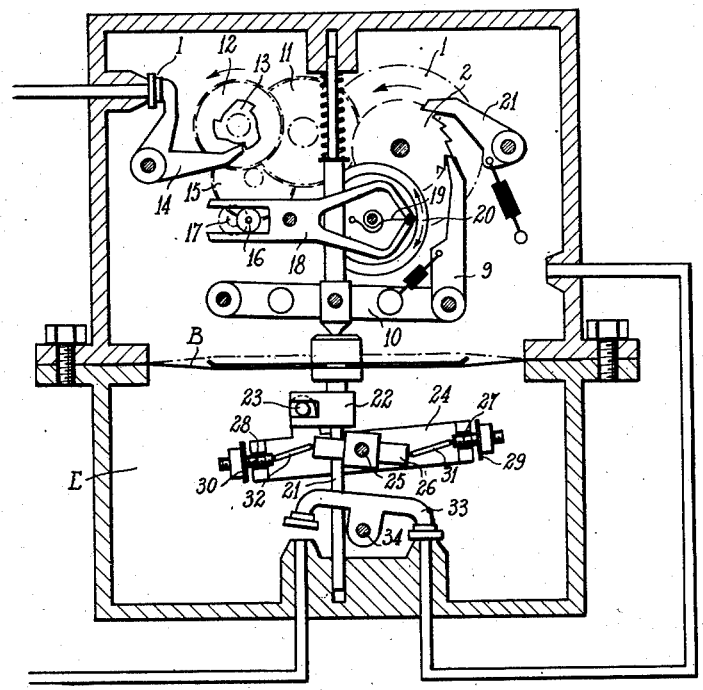
Figures 4 and 5 show elevational views of a complete arrangement according to the invention illustrating two stages in its operation.
Figure 5:
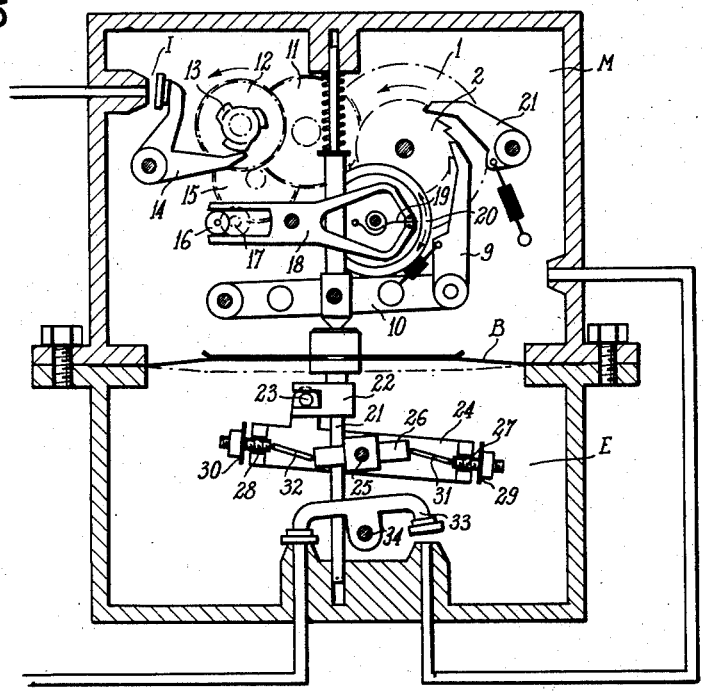
Figure 6:
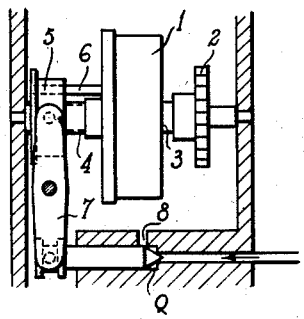
Figs. 6 and 7 are diagrammatical detail views relating to and taken from the left of, Figs. 4 and 5.
Figure 7:
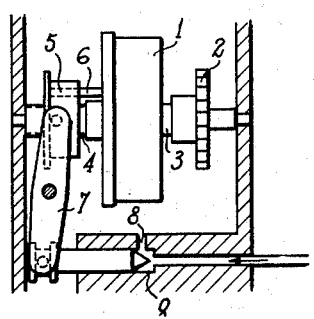

As shown in detailed Figs. 4 and 5, the power spring is mounted in a barrel 1 and has one end anchored to this barrel and the other end secured to the shaft 3 (see Figs. 6 and 7).

The shaft 3 which passes through an opening in barrel 1 is formed with a screw-threaded end on which a nut 5 is engaged, as shown, and the angular position of this nut is determined by a rod 6 rigid with the barrel and extending through the nut 5. A lever 7 is adapted to be rocked by the axial movement of the nut 5 for actuating a needle-valve 8 adapted to open or close the auxiliary gas inlet Q.

A ratchet wheel 2 is rigid with the barrel shaft. The barrel is adapted to drive gears 11 and 12, and the latter carries a cam disk 13. A bell-crank lever 14 carries the burner-feeding valve and is actuated by the cam disk 13 when the latter is rotated by the spring located in the barrel.

A gear 15 driven by the wheel 12 actuates an eccentric crankpin 16 whose axis of rotation is indicated at 17. This crankpin is adapted to oscillate a forked member 18 sustaining through a spring 19 the vibrations of the adjusting balance 20.

As the power spring is wound up due to the combined action of the diaphragm movements actuating the lever 10 and pawl 9, the nut 5 is moved to the right (Figs. 6 and 7) due to the relative movement of the barrel and of the barrel shaft. At a predetermined moment the needle-valve will be moved to the left of these figures to open the passage of gas from the lower chamber to the upper chamber of the device, thereby locking the diaphragm against motion.

As the barrel rotates under the impulse of the power spring R to drive the mechanism M the nut 5 will tend to move to the left (Figs. 6 and 7) and the needle valve 8 will be closed. Thus, a condition of equilibrium will be obtained.

This arrangement is also provided with a rocker (shown diagrammatically at E in Figs. 4 and 5) constructed as follows:

Centrally of the diaphragm B is secured a rod 21 carrying a fork member 22 engaged by a pin 23 fast with a rocker 24.

The rocker 24 is pivotally mounted on a pin 25 which has also fulcrumed thereon a member 26 having concave or recessed end faces. A pair of small cylindrical members 27, 28 are slidably engaged in bores formed in bent end portions of the rocker 24; a pair of leaf springs 29, 30 constantly urge these cylindrical members 27, 28 toward the centre of the figure.

A pair of rods 31, 32 formed with pointed ends are clamped by the springs 29, 30 between the member 26—27 and 26—28, as shown.

A twin-valved rocker 33 pivotally mounted on a pin 34 is operatively connected to the member 26 so that when the latter oscillates in the clockwise direction the rocker 33 rotates in the same direction, and vice-versa.

The operation of the assembly described in connection with Figs. 4 through 7 of the drawings is as follows:

Assuming the diaphragm B to be in its lowermost position (Fig. 4), the rocker 24 will be inclined to the left and the other parts positioned as shown in this figure.

When the diaphragm is rising due to the gas pressure acting on its lower face it moves the rod 21 and fork 22 upwards. This fork 22 carries along the pin 23 and the latter causes the member 24 to rotate about its axis 25, the member 26 remaining undisturbed.

At a predetermined moment the rocker 24 will be pivoted to an extent sufficient to bring the cylindrical members 27, 28, the rods 31 and 32, the member 26 and its pivot pin 25 in alignment.

As the diaphragm B continues its upward movement due to the gas pressure acting on its lower face, an over-centre condition will be attained and then the balance between these various members will be destroyed and the member 26 will be suddenly rocked to the left or in the counter-clockwise direction, this movement being assisted by the springs 29 and 30 acting on the members 27, 28 and rods 31, 32.

The twin-valved rocker 33 rigid with member 26 will also be rocked in the counter-clockwise direction and the gas inlet port will be closed, as shown in Fig. 5.

When the counter-pressure developed in the upper chamber will cause the diaphragm B to move downwards, the different members will act in the opposite direction and so forth.

Of course, the shape, proportions and dimensions of the parts illustrated and described herein may be varied within wide limits, and many modifications may be brought to the embodiments shown and described in this specification without departing from the spirit and scope of the invention.

What I claim is:

1. A gas actuated flashing device for beacons comprising a casing, a gas feed for the gas burner, a valve controlling said feed, means for controlling said valve, a spring motor mechanism in said casing controlling said means, a movable wall dividing said casing into two portions, said wall being acted on by the gas at the necessary pressure for winding the spring motor mechanism and by the gas for the feed pressure of the burner, the spring motor mechanism being located in the portion of said casing where said feed pressure exists.

2. An arrangement as set forth in claim 1 wherein the means for the control of the valve controlling the admission of gas to the burner as well as said valve are located in the portion of the casing enclosing said spring motor mechanism.

3. An arrangement according to claim 1 comprising a double valve acting upon the gas inlet under the movable wall and upon the gas inlet above the latter and a pivot with a sharp action provided between said wall and said double valve, said pivot and said valve being disposed in a location of small volume in order to reduce to a maximum the dead space under the movable wall.

4. An arrangement as set forth in claim 1 comprising a movable element whose displacements are a function of the degree of winding of said spring motor mechanism, and a valve controlled by said movable element and controlling the inlet of gas at the portion of the casing in which is located said spring mechanical movement of such a kind that when the spring is wound an equilibrium of pressure is established between the two faces of the movable wall while blocking said wall and when the spring is unwound the equilibrium of pressure is broken which assures the resetting into movement of the movable wall.

5. An arrangement as set forth in claim 4 in which the spring motor mechanism comprises a barrel containing said spring and a plug with a threaded prolongation, said spring being attached on one hand to the wall of the barrel and on the other hand to the plug, the movable element being formed by a nut which is threaded upon said threaded prolongation of said plug, a rod traversing said nut to guide the same fixed to said barrel so that said nut is actuated by a rotation movement in one direction or the other of said plug, said nut acting upon the valve controlling the inlet of gas to that portion of the casing in which the spring mechanical movement is located.

References Cited in the file of this patent
UNITED STATES PATENTS 1,015,532　　Attwood _____ Jan. 23, 1912

FOREIGN PATENTS 94,113　　Switzerland _____ Apr. 17, 1922
189,794　　Germany _____ Oct. 16, 1907